UNITED STATES PATENT OFFICE.

HENRY ERIC SCHABACKER, OF THOROLD, ONTARIO, CANADA, ASSIGNOR TO THE EXOLON COMPANY, OF BOSTON, MASSACHUSETTS, A CORPORATION OF MASSACHUSETTS.

SILICON CARBID AND METHOD OF MAKING SAME.

1,381,346.     Specification of Letters Patent.     Patented June 14, 1921.

No Drawing.     Application filed May 25, 1920. Serial No. 384,239.

*To all whom it may concern:*

Be it known that I, HENRY ERIC SCHABACKER, a citizen of the United States, residing at Thorold, Province of Ontario, Dominion of Canada, have invented certain new and useful Improvements in Silicon Carbids and Methods of Making Same, of which the following is a specification.

This invention relates to silicon carbid and particularly to the manufacture of such carbid in crystalline form. My present invention contemplates the production of such carbid of a quality greatly improved over the present commercial products and in a manner in which I am able to effect a very considerable economy.

As illustrative of my invention I shall employ a specific method of manufacture by which I am able to produce carbid in a very much improved state and with a considerable economy of manufacture.

In order to distinguish my present process it may be noted that heretofore in such manufacture the silica sand has usually been mixed with coke, usually petroleum coke, in such proportions as are required to effect the chemical reaction by which the carbon element is substituted for the oxygen in the silicon compound with the resultant release of carbon monoxid.

Petroleum coke has a fixed carbon content of only about 90%, and contains considerable impurities in the form of ash, iron, alumina, lime, volatile hydrocarbon, etc., which if present in the finished product make it difficult to successfully bond the material in abrasive wheels and the like, and also lowers the efficiency under which the silicon carbid may be produced. It is therefore the practice to produce porosity and aid in the volatilization of these impurities by the introduction of sawdust and salt in the mix.

I have found that pitch coke may be employed in the production of silicon carbid with a great increase in the purity and increasing efficiency in the production of the product and at a considerable saving.

Pitch coke is practically a pure carbon, having a very low content of ash and volatile combustible matter. A typical analysis follows: fixed carbon 98.1, sulfur, .4, ash, .3, volatile combustible matter 1.2.

Due to the higher content of fixed carbon, as compared with petroleum coke, less pitch coke per unit of silica sand need be used in the mix, and higher production of silicon carbid per 1000 H. P. hours may be obtained. Moreover, because of its low content of ash, etc., these impurities may be more readily removed, leaving the resultant product in a much higher state of purity and with a much higher production per unit of power consumed in its manufacture. A typical mix for pitch coke follows: Silica sand 2500, pitch coke 1500, salt 40, sawdust 300.

The advantage of my discovery while therefore of a simple nature is of great importance and one which is capable of adaptation in this art as a means of effecting a considerable economy in manufacture and as a considerable improvement in the product.

Various modifications may undoubtedly be made in the mixture of the materials and in the proportions or percentages used in the process. While my product is of course still chemically a silicon carbid, it is commercially a new and improved carbid.

All modifications or variations in process or product are therefore to be construed as in accordance with my invention if within the limits of the appended claims.

What I therefore claim and desire to secure by Letters Patent is:

1. That step in the process of making a silicon carbid consisting in combining sand and pitch coke.

2. That step in the process of making a silicon carbid consisting in substituting for the oxygen of the sand the carbon of pitch coke.

3. As a new article of manufacture a silicon carbid in which the carbon element is derived from pitch coke.

4. As a new article of manufacture a silicon carbid made from sand and pitch coke.

5. As a new article of manufacture, a silicon carbid consisting of pitch coke and sand in substantially the proportions of five parts by weight of sand to three parts by weight of pitch coke.

6. A mix for the manufacture of silicon carbid, consisting of sand and pitch coke in substantially the following proportions by weight; 2500 parts sand; and pitch coke 1500 parts.

7. A mix for the manufacture of silicon carbid, consisting of sand, pitch coke, salt and sawdust in substantially the following proportions by weight; sand 2500 parts; pitch coke 1500 parts; salt 40 parts; and sawdust 300 parts.

In testimony whereof I affix my signature in presence of two witnesses.

HENRY ERIC SCHABACKER.

Witnesses:
MAUD B. SCHABACKER,
REGINA A. BATTLE.